US008576048B2

(12) United States Patent
Kuenzi et al.

(10) Patent No.: US 8,576,048 B2
(45) Date of Patent: Nov. 5, 2013

(54) METHOD FOR ACCESSING A LOCKED OBJECT (75) Inventors: Adam Kuenzi, Salem, OR (US); Brian Quisling, Portland, OR (US); Ali Hodroj, Beaverton, OR (US)

(73) Assignee: GE Security, Inc., Bradenton, FL (US)

( * ) Notice: Subject to any disclaimer, the term of this patent is extended or adjusted under 35 U.S.C. 154(b) by 101 days.

(21) Appl. No.: 12/615,712

(22) Filed: Nov. 10, 2009

(65) Prior Publication Data
US 2011/0109433 A1 May 12, 2011

(51) Int. Cl.
G06F 7/04 (2006.01)
H04W 4/00 (2009.01)

(52) U.S. Cl.
USPC ............. 340/5.73; 340/5.7; 340/5.1; 340/5.2; 340/5.3

(58) Field of Classification Search
USPC ........... 340/5.73, 5.7, 5.1, 5.23, 5.2; 455/410, 455/466, 26.1
See application file for complete search history.

(56) References Cited

U.S. PATENT DOCUMENTS

| | | | |
|---|---|---|---|
| 5,418,844 A | 5/1995 | Morrisey et al. | |
| 5,524,146 A | 6/1996 | Morrisey et al. | |
| 5,835,583 A | 11/1998 | Hetz et al. | |
| 6,011,976 A | 1/2000 | Michaels et al. | |
| 6,038,305 A | 3/2000 | McAllister et al. | |
| 6,067,347 A | 5/2000 | Farris et al. | |
| 6,101,242 A | 8/2000 | McAllister et al. | |
| 6,122,357 A | 9/2000 | Farris et al. | |
| 6,167,119 A | 12/2000 | Bartholomew et al. | |
| 6,185,289 B1 | 2/2001 | Hetz et al. | |
| 6,338,088 B1 | 1/2002 | Waters et al. | |
| 6,404,858 B1 | 6/2002 | Farris et al. | |
| 6,453,167 B1 | 9/2002 | Michaels et al. | |
| 6,472,973 B1 * | 10/2002 | Harold et al. | 340/5.73 |
| 6,704,405 B1 | 3/2004 | Farris et al. | |
| 6,829,332 B2 | 12/2004 | Farris et al. | |
| 6,856,598 B1 | 2/2005 | Stanfield | |
| 6,920,487 B2 | 7/2005 | Sofer et al. | |
| 7,120,455 B1 | 10/2006 | Chen et al. | |
| 7,181,210 B2 | 2/2007 | Zabawskyj et al. | |
| 7,200,390 B1 | 4/2007 | Henager et al. | |
| 7,231,431 B2 | 6/2007 | Sofer et al. | |
| 7,272,216 B2 | 9/2007 | Elias et al. | |
| 7,272,406 B2 | 9/2007 | Chava et al. | |
| 7,302,273 B2 | 11/2007 | Chaudhuri | |

(Continued)

OTHER PUBLICATIONS

Thomas, Matt; "SMS Marketing: Double Opt-In Explained"; http://istobe.com/blog/2009/01/19/sms-marketing-double-opt-in-explained/; Jan. 19, 2009.*

Primary Examiner — Hai Phan
Assistant Examiner — Peter Mehravari
(74) Attorney, Agent, or Firm — Global Patent Operation; Marc A. Vivenzio (57) ABSTRACT A method for accessing a locked object. A first SMS message addressed to a short code and requesting access to the locked object is received by an Approval Authority computer and/or short code from one of a locked object and a requestor's wireless communication device. The Approval Authority computer determines whether to grant the requested access, and sends, back to one of the locked object and the requestor's wireless communication device, one of an access code for the locked object and a SMS reply containing the access code. If the requested access is granted, the Approval Authority also initiates billing the requestor a predetermined fee for the access.

14 Claims, 4 Drawing Sheets (56) References Cited

U.S. PATENT DOCUMENTS

| | | |
|---|---|---|
| 7,310,511 B2 | 12/2007 | Barnea et al. |
| 7,330,725 B2 | 2/2008 | Zabawskyj et al. |
| 7,389,117 B2 | 6/2008 | Lovell, Jr. |
| 7,437,146 B2 | 10/2008 | Dudley et al. |
| 7,460,861 B2 | 12/2008 | Zabawskyj et al. |
| 7,460,873 B2 | 12/2008 | Lovell, Jr. et al. |
| 7,505,767 B2 | 3/2009 | Zabawskyj et al. |
| 7,548,756 B2 | 6/2009 | Velthuis et al. |
| 7,606,558 B2 * | 10/2009 | Despain et al. ............... 455/410 |
| 8,019,362 B2 * | 9/2011 | Sweatman et al. ............ 455/466 |
| 2005/0099262 A1 * | 5/2005 | Childress et al. .............. 340/5.6 |
| 2009/0179735 A1 * | 7/2009 | Van Rysselberghe ....... 340/5.73 |

* cited by examiner

METHOD FOR ACCESSING A LOCKED OBJECT

CROSS-REFERENCE TO RELATED APPLICATIONS

Not Applicable

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to lockboxes generally, and more particularly to certain new and useful advances in electronically accessing the same, as well as keyboxes, electronic locks and the like, of which the following is a specification, reference being had to the drawings accompanying and forming a part of the same.

2. Description of Related Art

Traditional lockboxes are used to store objects, such as keys, for use by one or more authorized persons. Such lockboxes have mechanical locks or electronic locks. Some electronic lockboxes are equipped with wireless transceivers that allow them to communicate with a wireless handheld device operated by a user using short-range wireless communication protocols. Some electronic lockboxes equipped with wireless transceivers are configured to communicate with one or more remote access control servers using long-range wireless communication protocols.

Short codes are phone numbers shorter than ten (10) digits. When a SMS is sent to a short code, the telecommunications carrier recognizes the SMS as a service request and routes the text in the message to the appropriate service provider, which then provides and/or charges for the requested service.

BRIEF SUMMARY OF THE INVENTION

The present disclosure describes embodiments of a method for accessing a locked object, such as, but not limited to, a lockbox, a keybox and electronic lock, etc. The method uses SMS messages to request, pay for and obtain access rights to the locked object.

One problem addressed by embodiments of the invention is how to charge requestors for access to a locked object. Embodiments of the method described herein provide a way to charge the requestor's regular cellular or wireless telephone bill, and a way to aggregate the charges from multiple keyholders into a single payment from a SMS aggregator. In one embodiment, a requestor is a keyholder, e.g. someone previously authorized, by wireless key device, smartcard or other means, to access a locked object one or more times. A non-limiting example of a keyholder is a real estate agent or broker that has been granted authority to access one or more real-estate lockboxes. Alternatively, a requestor is a non-keyholder, e.g., someone not previously authorized to access a locked object. Non-limiting examples of a non-keyholder are: plumbers, painters, electricians, landscapers, architects, contractors, designers, housesitters and the like.

Another problem is how to allow requestors to interact with, and gain authorized access to, a locked object. Use of SMS short codes solves this problem because it allows non-keyholders to request access to a locked object and to pay for this access.

Other features and advantages of the disclosure will become apparent by reference to the following description taken in connection with the accompanying drawings.

BRIEF DESCRIPTION OF THE SEVERAL VIEWS OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION OF THE INVENTION

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

Figure 1:
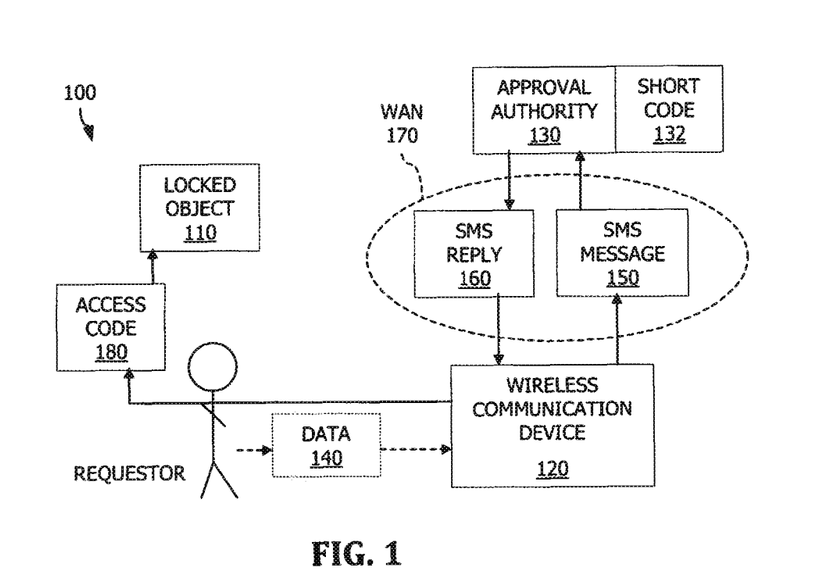
FIG. 1 is a diagram of an exemplary system configured for use with an embodiment of the invention.

FIG. 1 is a diagram of an exemplary system 100 configured for use with an embodiment of the invention. The system 100 comprises a locked object 110, which is configured to unlock and/or open when an access code 180 is input by a user or requestor. For illustration purposes only, the locked object 110 of FIG. 1 is equipped with a mechanical lock. In contrast, the locked object 111 of FIGS. 2 and 3 is equipped with an electronic lock or a digital lock, which may have a user interface, e.g., a display, a keypad, a touch screen, a microphone, a speaker, etc.

Figure 4:
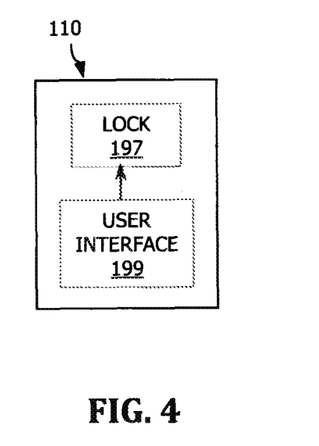
FIG. 4 is a diagram of an embodiment of a mechanical locked object.

Referring again to FIG. 1, the system 100 further comprises an Approval Authority computer 130 having a short code 132 associated therewith. The system further comprises a wireless communication device 120, which is configured to receive data 140 input by the user, to send an SMS message 150 comprising at least a request for access to the locked object to the Approval Authority computer 130 via the short code 132. The wireless communication device 120 is further configured to receive an SMS Reply 160 from the Approval Authority 130, which comprises a denial message, an approval message, an access code, a billing message, a Double-Opt-In Message, a combination of an approval message and an access code, or a combination of an access code, an approval message and a billing message. The wireless communication device 120 is further configured to communicate the SMS Reply to the user, so the user can manually input the access code 180 to the locked object 110's user interface 199 (FIG. 4). The system 100 further comprises a wide area network ("WAN") 170, such as the Internet, over which signals are wired and/or wirelessly transmitted between the wireless communication device 120 and the Approval Authority computer 130 using one or more known communication protocols.

Figure 2:
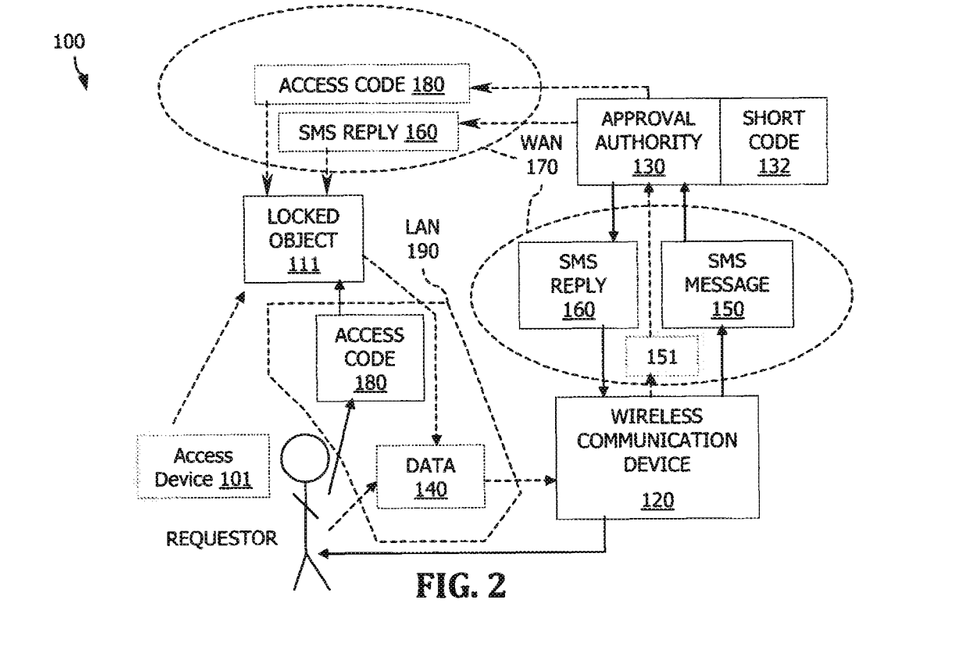
FIG. 2 is a diagram of an alternate embodiment of the exemplary system of FIG. 1.
Figure 3:
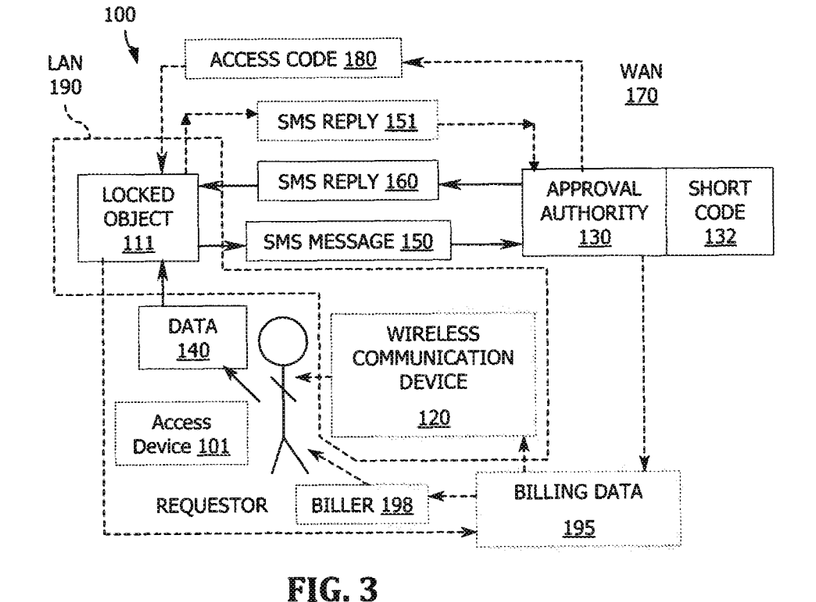
FIG. 3 is a diagram of an alternate embodiment of the exemplary system of FIG. 2.

FIG. 2 is a diagram of an alternate embodiment of the exemplary system 100 of FIG. 1. FIG. 2 shows the same components as FIG. 1, e.g., the WAN 170, the user, the data 140 input by the user into the wireless communication device 120, the SMS message 150, the SMS Reply 160, the Approval Authority computer 130, the short code 132, and the access code 180. There are two differences however.

First, the locked object 111 is equipped with an electronic or digital lock 102 (FIG. 5), and also comprises one or more of the other components shown in FIG. 5 and further described below.

Second, the wireless communication device 120 is not only configured to communicate with the Approval Authority computer 130 as noted above, but is also configured to wirelessly communicate with the locked object 111 over a local area network ("LAN") 190. In other words, the wireless communication device 120 is configured to wirelessly transmit the access code 180 directly to the locked object 111 over the LAN 190, with or without communicating the access code 180 to the user.

Third, and alternatively, the Approval Authority computer 130 is configured to communicate with the locked object 111 over the WAN 170. In other words, the Approval Authority computer 130 is configured to transmit (i) the SMS reply 160 (containing at least one of a denial message, an approval message, an access code, a billing message, a Double-Opt-In message, a combination of the approval message and the access code, or a combination of the access code, the approval message and the billing message) and (ii) the access code 180 by itself to the locked object 111. In turn, the locked object 111 is configured to communicate, e.g., display and/or broadcast via a speaker, the approval message, the denial message, the Double-Opt-In message, a combination of the approval message and the access code, or a combination of the access code, the approval message and the billing message. If the SMS Reply 160 contains the Double-Opt-In message, the requestor's wireless communication device 120 is configured to transmit a SMS Reply 151 that contains a user acceptance or a user refusal back to the Approval Authority computer 130 over the WAN 170.

Fourthly, and alternatively, the locked object 111 is configured to transmit the data 140 over the LAN 190 to the wireless communication device 120. In such an embodiment, the data 140 transmitted by the locked object 111 comprises at least one of: a locked object identifier, a telephone number of a building with which the locked object 111 is associated, a GPS coordinate of the locked object 111, a GPS coordinate of an area proximate the locked object 111, an address of a building or object with which the locked object 111 is associated, and so forth. Each of these types of data may be stored in the computer-readable memory 106 (FIG. 5).

FIG. 3 is a diagram of an alternate embodiment of the exemplary system of FIG. 2. FIG. 3 shows the same components as FIG. 1, e.g., the WAN 170, the user, the data 140 input by the user into the wireless communication device 120, the SMS message 150, the SMS Reply 160, the Approval Authority 130, the short code 132, the locked object 111, and the access code 180. However, in this embodiment, the Approval Authority computer 130 is configured to communicate with the locked object 111 over the WAN 170. The Approval Authority computer 130 is also configured to communicate with the requestor's wireless communication device 120 over the LAN 190. Additionally, the Approval Authority computer 130 is further configured to output billing data 195 to the wireless communication device 120 and/or to a biller 198, which may be an internal biller or a third party biller. In one embodiment, a SMS aggregator resident on the Approval Authority computer 130, or on a computer associated with the biller 198, is configured to aggregate access charges for multiple requestors into a single bill or payment. Also, the SMS aggregator may be configured to bill a single requestor for the purchase of a bulk number of one-time accesses to one or more locked objects 110, 111.

In operation, the user inputs data 140 into the locked object 111 using a user interface 103 (FIG. 5) thereof, e.g., a keypad, a touch screen, a cursor controller, a microphone, a smartcard reader and the like. The locked object 111 then generates and sends the first SMS message 150 to the Approval Authority computer 130's short code 132. The Approval Authority computer 130 is configured to receive and process the first SMS message 150, and send the SMS Reply 160 back to the locked object 111. Alternatively, the Approval Authority computer 130 is configured to send the access code 180 by itself to the locked object 111.

In each of FIGS. 1, 2 and 3, the locked object 110, 111 is configured to unlock and/or open upon receiving the access code 180 as a manual or electronic or digital input.

Additionally, in each of FIGS. 1, 2 and 3, the received first SMS message 150 contains at least an identifier, which identifies the locked object 110, 111. The identifier is any type of data or information that allows the general or special purpose computer, e.g., the Approval Authority 130, to identify which particular locked object 110, 111 (or locked objects) for which access is requested and the access code(s) therefor. For example, in one embodiment, the identifier is a numeric, alphabetical or alphanumeric ID code or name, which was previously and uniquely assigned to the locked object 110, 111. In another embodiment, the identifier is Global Positioning System ("GPS") coordinates of an area proximate the locked object 110, 111. In another embodiment, the identifier is a combination of the numeric, alphabetical or alphanumeric ID code or name and the GPS coordinates of an area proximate the locked object 110, 111.

The first SMS message 150 may further comprise other types of data. For example, the first SMS message 150 may further comprise a telephone number of the requestor's wireless communication device 120. The Approval Authority computer 130 is configured to use the received telephone number to determine whether access should be granted and/or to charge one or more predetermined fees for the access. The Approval Authority computer 130 may be configured to transmit the received telephone number of the requestor's wireless communication device 120 in the billing data 195 to the biller 198, which can then bill the requestor directly.

For example, the Approval Authority computer 130 may further be configured to compare the received telephone number with a computer-readable database, e.g., a list of blocked telephone numbers, for which access should not be granted. This list of blocked telephone numbers may include, but is not limited to, (a) telephone numbers of wireless communication devices reported lost, missing or stolen and (b) telephone numbers of persons for which access should not be granted, e.g., persons listed on watch lists, persons listed as failing background checks, etc. In such an embodiment, the Approval Authority computer 130 is configured to transmit an access code back to the wireless communication device 120, and/or to charge, or initiate charging, one or more predetermined fees to the received telephone number of the requestor's wireless communication device 120, if the received telephone number does not appear on the list of blocked telephone numbers.

The first SMS message 150 may also comprise a predetermined personal identification number "PIN". In one embodiment, the PIN is an identifier, such as an employee identification number, a license number, etc., that is uniquely associated with an identity of a requestor (e.g., a user of the wireless communication device). Additionally, or alternatively, the PIN is a security password that the requestor provides in the first SMS message, or in a subsequent SMS message, as part of a multi-factor security procedure. For example, in one embodiment, the handheld wireless device, or possession thereof, is the first security factor, and the password is the second security factor.

The PIN may comprise some or all of the data 140 input by the requestor to the wireless communication device 120 or to the locked object 111. In either case, the Approval Authority computer 130 is configured to use the received PIN to determine, or confirm, whether the requested access to the locked object 111 should be granted, and to determine and/or record an identity of the requestor. For example, the Approval Authority computer 130 is configured to compare the received PIN with the computer readable database, which alternatively, or in addition to, the list of locked object identifiers and/or list of blocked telephone numbers, comprises a previously-created list of PINs. This database is stored in a computer-readable memory that is local to or remote from the Approval Authority computer 130. Each PIN in the list of PINs is associated with at least a name of a requestor. Each PIN in the list of PINs may further be associated with a locked object identifier and/or an access code unique thereto. Consequently, when the Approval Authority computer 130 locates a received PIN in the database, the Approval Authority computer 130 will determine which access code to transmit back to the wireless communication device 120 (or to the locked object 111, if the locked object 111 is equipped with a wireless transceiver).

FIG. 4 is a diagram of an embodiment of a locked object 110 having a mechanical lock 197 and a mechanical user interface 199, e.g. one or more combination dials, one or more pushbuttons, etc.

Figure 5:
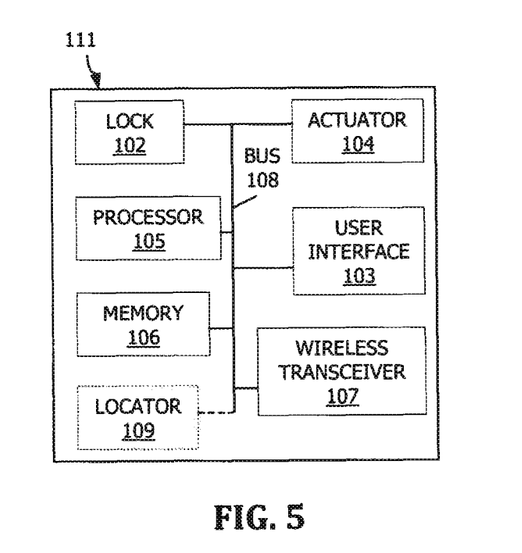
FIG. 5 is a diagram of an embodiment of an electrical or digital locked object.

FIG. 5 is a diagram of an embodiment of a locked object 111 having an electronic or digital lock 102 coupled by a bus 108 with one or more components such as: an actuator 104 configured to unlock and lock the lock 102 and/or to open the locked object 111, a computer processor 105, a computer readable memory 106, a user interface 103, a wireless transceiver 107 and, optionally, a locator 109. The computer processor 105 is configured to perform one or more elements of the operating methods described herein. In particular, the computer processor 105 is configured to receive and process data 140 input by the user or requestor into the locked object 111 using the user interface 103, which as described above may comprise a display, a keypad, a touch screen, a microphone, a speaker, a smartcard reader and the like. The wireless transceiver 107 is configured for at least one of communication with the Approval Authority computer 130 and/or short code 132 over the WAN 170 and communication with the wireless communication device 120 over the LAN 190. The locator 109 comprises software, firmware and/or circuitry that are configured to determine the Global Positioning System ("GPS") coordinates of the locked object 111 and/or an area proximate the locked object 111. Additionally or alternatively, the locator 109 is configured to determine an address of the locked object 111 or of an object, such as a building, with which the locked object 111 is associated. The locked object 111 may further include a power source, such as a fuel cell or battery.

Figure 6:
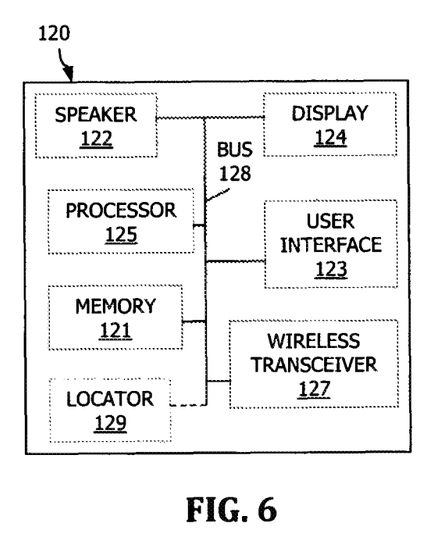
FIG. 6 is a diagram of an embodiment of a wireless communication device.

FIG. 6 is a diagram of an embodiment of a wireless communication device 120, which comprises one or more of the following components: a bus 128 coupled with a speaker 122, a display 124, a computer processor 125, a user interface 123, a memory 121, a wireless transceiver 127 and, optionally, a locator 129. The wireless transceiver is configured to communicate with the Approval Authority computer 130 and/or short code 132 over the WAN 170 and/or to communicate with the locked object 111 over the LAN 190. The locator 129 comprises software, firmware and/or circuitry that are configured to determine the Global Positioning System ("GPS") coordinates of the locked object 111, the wireless communication device 120, an area proximate the locked object 111, and/or an area proximate the wireless communication device 120. The user interface 123 comprises at least one of a keypad, a touch screen, a microphone, and the like.

Wireless Communication Device and/or Locked Object

Figure 7:
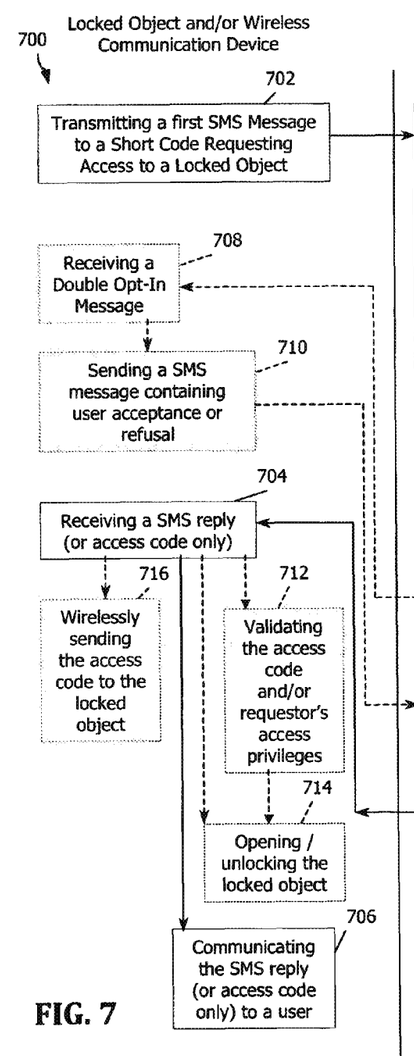
FIG. 7 is a flowchart illustrating an embodiment of method performed by the computer processor, software, firmware and/or circuitry of a requestor's wireless communication device and/or the computer processor, software, firmware and/or circuitry of a locked object.
Figure 8:
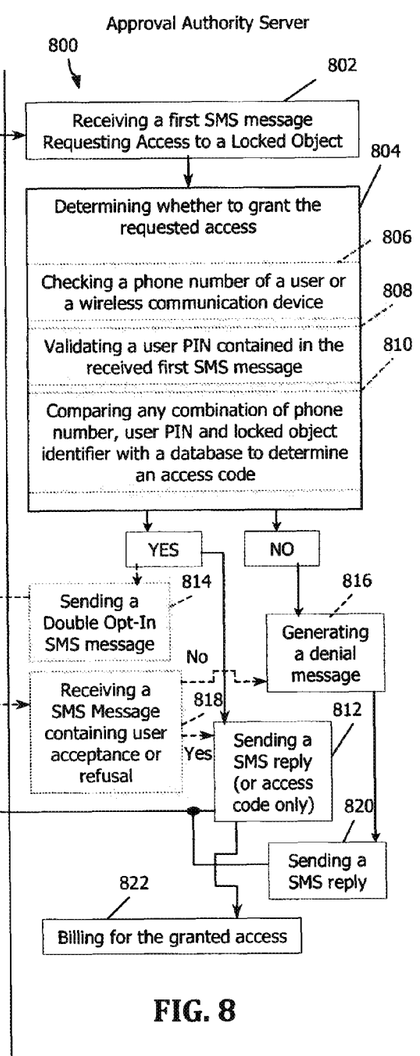
FIG. 8 is a flowchart illustrating an embodiment of a method performed by the computer processor, software, firmware and/or circuitry of an Approval Authority computer and/or server.

FIG. 7 is a flowchart illustrating an embodiment of method 700 performed by the computer processor 125 (FIG. 6) or 105 (FIG. 5), software, firmware and/or circuitry of a requestor's wireless communication device 120 (FIGS. 2 and 3) and/or the computer processor, software, firmware and/or circuitry of a locked object 111 (FIGS. 2 and 3), respectively. FIG. 8 is a flowchart illustrating an embodiment of a method 800 performed by the computer processor, software, firmware and/or circuitry of an Approval Authority computer 130 (FIGS. 1, 2, and 3).

Each block, or combination of blocks, in each of FIGS. 7 and 8 represents one or more functions that are implemented by computer-readable instructions, which are stored in a computer-readable memory. Unless specified otherwise herein, each of these functions is performed by a computer processor of either a general-purpose computer or a special purpose computer, e.g., a machine or device—and not by the mental processes of a user of the system 100. Moreover, unless specified otherwise herein, the function(s) represented by each block, or combination of blocks, may be performed linearly, concurrently or in any suitable order.

Referring to FIGS. 1, 2, 3, 5, 6 and 7, the method 700 begins, as represented by block 702, by transmitting a first SMS message 150 to a Short Code 132 of an Approval Authority computer 130. The first SMS message 150 requests access to a locked object 110, 111 and comprises various types of information and/or data, as previously described. In one embodiment, the first SMS message 150 originates from a wireless communication device 120 of a requestor (e.g., a non-keyholder) who needs legitimate access to a locked object 110, 111. Alternatively, the first SMS message 150 originates from the locked object 111 based on data 140 input therein by a requestor who needs legitimate access to a locked object 110.

If the Approval Authority computer 130 determines the requested access can be granted, the method 700 further comprises, as represented by block 704, receiving a SMS reply 160 (or access code 180 only). The SMS reply 160 (or access code 180 only) is received and processed by the requestor's wireless communication device 120. Alternatively, the SMS reply 160 (or access code 180 only) is received and processed by a computer processor 105 of the locked object 111.

If the SMS reply 160 (or access code 180 only) is received by the requestor's wireless communication device 120, the method 700 further comprises, as represented by block 706, communicating the SMS Reply 160 (or access code 180 only) to the requestor via the user interface 123 and/or speaker 122. Thereafter, the requestor manually inputs the access code 180 into a user interface 199 or 103, such as a keypad, touch screen, or combination lock, of the locked object 110, 111 to unlock and/or open it. Alternatively, the method 700 further comprises, as represented by block 714, wirelessly sending the access code 180, from the requestor's wireless communication device 120 or from the Approval Authority computer 130, to the locked object 111; and further comprises, as represented by block 712, unlocking and/or opening the locked object 111.

In an alternate embodiment, the method 700 proceeds from block 702 and further comprises, as represented by block 708, receiving a Double-Opt-In Message, which is one example of the SMS Reply 160. Sent from the Approval Authority computer 130, the Double-Opt-In Message is received by the requestor's wireless communication device 120 and communicated to the requestor via the user interface 123 and/or speaker 122. Alternatively the Double-Opt-In message is sent from the Approval Authority computer 130, received by the locked object 111 and communicated to the requestor via the user interface 103. In one aspect, the Double-Opt-In SMS Message comprises a text or audio message, which may comprise words to the effect of "you will be charged $xx. If you agree to this charge, please click, or say, 'Yes'".

Thereafter, the method 700 further comprises, as represented by block 710, sending a SMS Reply 151 containing a user acceptance or a user refusal. The SMS Reply 151 containing a user acceptance or a user refusal is generated and transmitted by the requestor's wireless communication device 120, or by the locked object 111, based on data 140 input by the requestor in response to the Double-Opt-In Message.

Approval Authority

Referring to FIGS. 1, 2, 3, 4, 5, 6, 7 and 8, an embodiment of the method 800 begins, as represented by block 802, by receiving the first SMS message 150 addressed to a predetermined short code 132 of the Approval Authority computer 130. The first SMS message 150 comprises the information described above, including, but not limited to: a telephone number of the requestor's wireless communication device 120, a PIN code provided by the requestor, a locked object identifier, and so forth.

As represented by block 804, the method 800 further comprises determining whether access to the locked object 110, 111 can be granted. As represented by block 806, this may further comprise, checking the received telephone number against a database of pre-registered "allowed" telephone numbers. Optionally, as represented by block 808, this may further comprise verifying or validating the received PIN against a database of pre-registered PINS. Optionally, as represented by block 810, this may further comprise comparing any combination of (a) the received telephone number, (b) the received PIN and (c) the received locked object identifier with the database to determine whether the requestor is authorized to access the locked object 110, 111, and if so, what access code 180 to transmit back to the requestor's wireless communication device 120 (or to the locked object 111, if the locked object 111 is equipped with a wireless transceiver 107).

As represented by block 812, the method 800 further comprises sending a SMS Reply 160 (or access code 180 only) back to the requestor's wireless communication device 120, or to the locked object 111.

Thereafter, the method 800 may further comprise, as represented by block 822, billing the requestor, or the requestor's telephone number, for the granted access. Thus, the SMS Reply 160 of block 812 comprises at least one of (i) an access code 180 for the locked object 110, 111 and (ii) an indication that charges for the granted access will be billed to the telephone number of the requestor's wireless communication device 120. Depending on the embodiment, the access code 180 is a phrase of predetermined length composed entirely of letters or numbers or composed of any suitable combination of letters and numbers. The access code 180 may also have other forms. For example, in one embodiment, the access code 180 is one of: a hyperlink to download an access program to the wireless communication device 120, a picture to wirelessly send to the locked object 111, and a business card to wirelessly send to the locked object 111, etc.

Returning briefly to block 804, which represents determining whether to grant the requested access to the locked object 110, 111, the method 800 may optionally further comprise, as represented by block 814, transmitting a Double-Opt-in SMS Message back to the requestor's wireless communication device 120, or to the locked object 111, if it is determined that the requested access can be granted. Thereafter, the method 800 may further comprise, as represented by block 818, receiving a SMS Reply 151 that contains a user acceptance or a user refusal in reply to the Double-Opt-In message. If the SMS Reply 151 contains the user acceptance, the method 800 may proceed to blocks 812 and 822, as described above. If the SMS Reply 151 contains the user refusal, the method 800 may proceed to blocks 816 and 820, as described below.

Referring again to block 804, if it is determined that the requested access cannot be granted, the method 800 optionally proceeds to block 816, which represents generating a denial message, which is another example of the SMS Reply 160. Otherwise, the method 800 proceeds directly to block 820, which represents sending the SMS Reply 160 back to the requestor's wireless communication device 120, or to the locked object 111. When the denial message is generated, it is contained in the SMS Reply 160. Thus, the SMS Reply 160 of block 820, comprises an indication that access is denied.

Examples of the locked object 110 and 111 include, but are not limited to: real estate lockboxes, door locks, vaults, vehicle doors, home key vaults, pool gates, remote access sites like self storage facilities, secure community gates, parking garages, etc.

Embodiments of the invention provide one or more technical effects, among which are: a relatively simple way for non-keyholders to request and obtain access to a locked object; and a commercial advantage of being able to charge money for providing the requested access to the locked object.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

What is claimed is:

1. A method, comprising:
   receiving from a real-estate lockbox a first SMS message addressed to a short code and requesting access to the real estate lockbox;
   determining whether to grant the requested access;
   sending a Double-Opt-In SMS message to the real-estate lockbox;
   receiving from the real-estate lockbox a SMS reply containing a user acceptance or a user denial;
   sending back to the real-estate lockbox one of an access code for the real-estate lockbox and a SMS reply containing the access code; and
   initiating billing for the granted access,
   wherein the initiating billing for the granted access further comprises transmitting billing data to at least one of a requestor's wireless communication device and a biller.

2. The method of claim 1, further comprising:
   checking a telephone number associated with the requestor's wireless communication device against a list of telephone numbers for which access should not be granted.

3. The method of claim 1, further comprising:
   checking a telephone number associated with the requester's wireless communication device against a list of approved telephone numbers for which access should be granted.

4. The method of claim 1, wherein the receiving the first SMS message further comprises receiving a PIN code associated with a requestor, and wherein the determining whether to grant access further comprises comparing the received PIN code with a list of PIN codes authorized to access the real-estate lockbox.

5. The method of claim 1, wherein the receiving first SMS message further comprises receiving a PIN code associated with a requester and a locked object identifier, and wherein the determining whether to grant access further comprises comparing the received PIN code, a telephone number, and the locked object identifier to a data base to determine whether the requester is authorized to access the real-estate lockbox.

6. The method of claim 1, wherein the initiating billing for the granted access comprises aggregating access charges from a plurality of access requesters into a single bill.

7. The method of claim 6, wherein the single bill comprises a bulk number of one-time accesses to one or more real-estate lockboxes.

8. The method of claim 1, wherein the wireless communication device comprises a cellular telephone and wherein the initiating billing for the granted access comprises billing a telephone number associated with the cellular telephone for the requested access.

9. A method, comprising:
   receiving from a real-estate lockbox a first SMS message addressed to a short code and requesting access to the real-estate lockbox;
   determining whether to grant the requested access;
   sending to the real-estate lockbox a second SMS message containing a Double-Opt-In;
   receiving from the real-estate lockbox a third SMS message containing a user refusal;
   generating a denial; and
   sending to the real-estate lockbox a fourth SMS message containing the denial.

10. The method of claim 1, wherein the receiving first SMS message further comprises receiving one of a GPS coordinate associated with the real-estate lockbox, a GPS coordinate of an area proximate the real-estate lockbox, and an address of a building or object with which the real-estate lockbox is associated.

11. The method of claim 1, wherein the Double-Opt-In SMS message further comprises consent to receive a premium rate service in the form of the SMS reply containing the access code billed to a requestor's wireless telephone bill.

12. The method of claim 1, wherein the sending one of an access code for the real-estate lockbox and a SMS reply containing the access code further comprises an approval authority computer directly communicating the access code to the real-estate lockbox.

13. The method of claim 1, wherein the sent one of an access code for the real-estate lockbox and a SMS reply containing the access code is sent directly to the real-estate lockbox.

14. The method of claim 1, wherein the received SMS reply containing the user acceptance or user denial comprises a Double-Opt-In SMS message sent a short code associated with an approval authority.

* * * * *

UNITED STATES PATENT AND TRADEMARK OFFICE
CERTIFICATE OF CORRECTION

PATENT NO. : 8,576,048 B2
APPLICATION NO. : 12/615712
DATED : November 5, 2013
INVENTOR(S) : Kuenzi et al.

It is certified that error appears in the above-identified patent and that said Letters Patent is hereby corrected as shown below:

In the Specification

In Column 7, Line 64, delete "PINS." and insert -- PINs. --, therefor.

In the Claims

In Column 9, Lines 38-39, in Claim 3, delete "requester's" and insert -- requestor's --, therefor.

In Column 9, Line 50, in Claim 5, delete "requester" and insert -- requestor --, therefor.

In Column 10, Line 3, in Claim 5, delete "requester" and insert -- requestor --, therefor.

In Column 10, Line 7, in Claim 6, delete "requesters" and insert -- requestors --, therefor.

Signed and Sealed this
Eleventh Day of February, 2014

Michelle K. Lee
*Deputy Director of the United States Patent and Trademark Office*